(12) United States Patent
Honda

(10) Patent No.: US 10,647,158 B2
(45) Date of Patent: May 12, 2020

(54) PNEUMATIC TIRE

(71) Applicant: BRIDGESTONE CORPORATION, Chuo-ku, Tokyo (JP)

(72) Inventor: Shingo Honda, Kodaira (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 68 days.

(21) Appl. No.: 15/516,707

(22) PCT Filed: Oct. 9, 2015

(86) PCT No.: PCT/JP2015/005143
§ 371 (c)(1),
(2) Date: Apr. 4, 2017

(87) PCT Pub. No.: WO2016/067533
PCT Pub. Date: May 6, 2016

(65) Prior Publication Data
US 2017/0297377 A1 Oct. 19, 2017

(30) Foreign Application Priority Data
Oct. 27, 2014 (JP) .................... 2014-218602

(51) Int. Cl.
*B60C 11/03* (2006.01)
*B60C 11/00* (2006.01)
(Continued)

(52) U.S. Cl.
CPC ...... *B60C 11/0083* (2013.01); *B60C 11/0304* (2013.01); *B60C 11/0306* (2013.01);
(Continued)

(58) Field of Classification Search
CPC ................. B60C 11/1376; B60C 11/0083
See application file for complete search history.

(56) References Cited

U.S. PATENT DOCUMENTS 4,722,378 A * 2/1988 Carolla ............... B60C 11/0302
152/209.15
8,925,598 B2 1/2015 Ebiko
(Continued)

FOREIGN PATENT DOCUMENTS

CN 102218976 A 10/2011
EP 2067636 A1 6/2009
(Continued)

OTHER PUBLICATIONS

Sep. 22, 2017, Search Result of the Extended European Search Report issued by the European Patent Office in the corresponding European Patent Application No. 15853749.8.
(Continued)

*Primary Examiner* — Steven D Maki
(74) *Attorney, Agent, or Firm* — Kenja IP Law PC

(57) ABSTRACT

The pneumatic tire of this disclosure includes on a tread surface four or five circumferential grooves, and includes a pair of shoulder land portions, a pair of intermediate land portions, and one or a pair of central land portions partitioned thereon, wherein: in a tread widthwise cross sectional view at an unloaded condition when the tire is mounted to an applicable rim and applied with a prescribed internal pressure, when drawing a virtual arc R1 protruding to a tire radial outer side, of which a center of curvature is located on a tire equatorial plain, across four tread widthwise edges adjacent to the circumferential grooves of outlines of the pair of intermediate land portions, a correlation among each protrusion amount t1, t2 and t3 of outlines of the central land portions, the intermediate land portions and the shoulder land portions from the virtual arc R1 satisfies:

$t1 < t2$, and $t3 < t2$.

8 Claims, 1 Drawing Sheet

(51) Int. Cl.
  *B60C 11/04*   (2006.01)
  *B60C 11/13*   (2006.01)
  *B60C 11/12*   (2006.01)

(52) U.S. Cl.
  CPC .......... *B60C 11/0332* (2013.01); *B60C 11/04* (2013.01); *B60C 11/1236* (2013.01); *B60C 11/1376* (2013.01); *B60C 2011/0341* (2013.01)

(56) References Cited

U.S. PATENT DOCUMENTS

| | | | |
|---|---|---|---|
| 2011/0079334 A1* | 4/2011 | Bott | B60C 11/0302 152/209.14 |
| 2013/0092301 A1 | 4/2013 | Ebiko et al. | |
| 2013/0240101 A1 | 9/2013 | Kameda | |
| 2014/0166169 A1 | 6/2014 | Tanaka | |
| 2014/0283965 A1* | 9/2014 | Takahashi | B60C 11/0008 152/209.5 |
| 2014/0311640 A1 | 10/2014 | Takahashi | |
| 2016/0009143 A1* | 1/2016 | Kobayashi | B60C 11/11 152/209.15 |

FOREIGN PATENT DOCUMENTS

| | | |
|---|---|---|
| JP | H07186619 A | 7/1995 |
| JP | H09193605 A | 7/1997 |
| JP | H09207520 A | 8/1997 |
| JP | 3520944 B2 | 4/2004 |
| JP | 2004268817 A | 9/2004 |
| JP | 3583537 B2 | 11/2004 |
| JP | 2005263180 A | 9/2005 |
| JP | 2005319890 A | 11/2005 |
| JP | 2006168638 A | 6/2006 |
| JP | 2007331439 A | 12/2007 |
| JP | 2009161001 A | 7/2009 |
| JP | 2010012978 A | 1/2010 |
| JP | 4408236 B2 | 2/2010 |
| JP | 4453435 B2 | 4/2010 |
| JP | 4826681 B1 | 11/2011 |
| JP | 2012106608 A | 6/2012 |
| JP | 4973020 B2 | 7/2012 |
| JP | 2013091444 A | 5/2013 |
| JP | 2013189121 A | 9/2013 |
| JP | 2013193512 A | 9/2013 |
| JP | 5387707 B2 | 1/2014 |
| JP | 5416750 B2 | 2/2014 |
| JP | 2014184808 A | 10/2014 |
| WO | WO-2014/148260 A1 * | 9/2014 |

OTHER PUBLICATIONS

Jul. 2, 2018, search result of Office Action issued by the State Intellectual Property Office in the corresponding Chinese Patent Application No. 201580057678.6.

* cited by examiner

PNEUMATIC TIRE

TECHNICAL FIELD

This disclosure relates to a pneumatic tire.

BACKGROUND

Conventionally, as a pneumatic tire having land portions partitioned by a plurality of circumferential grooves, suggested are various tires having defined outlines of the land portions in a tread widthwise cross sectional view, such that a ground contact area of the land portion becomes a specific shape when the tire contacts the ground.

For example, in PTL 1, suggested is a pneumatic tire having a center rib extending in a tread circumferential direction, which is partitioned between a pair of main grooves disposed on a tread portion, wherein: a cross sectional profile line of a tread surface of the center rib crosses a virtual tread profile line which smoothly connects a tread surface inclusive of both ground contact edges except for the center rib, a tire axial central portion of the center lib forms a smooth convex shape toward a tire radial outer side, and protrudes from the virtual tread profile line toward the tire radial outer side, and at least one edge portion of the center rib caves in on a tire radial side inner than the virtual tread profile line. According to this tire, it is possible to achieve both the steering stability and the hydroplaning preventing performance at a high degree.

CITATION LIST

Patent Literature

PTL1: JP2005-319890A

SUMMARY

Technical Problem

Here, although the tire as disclosed in the aforementioned PTL 1 is capable of achieving both the steering stability and the hydroplaning preventing performance, according to this tire, on the tread surface, the center rib is of a shape protruding to the tire radial outer side with respect to the virtual tread profile line L2 which smoothly connects the tread surface except for the center rib, and thus there is a risk that uneven wear of the center rib becomes severe. Specifically, the central portion of the tire tread surface is an area with a large ground contact length to the road surface among the tire tread surface, and thus is likely to be worn comparatively (likely to generate uneven wear). Therefore, there is a risk of further uneven wear if the center rib located on the central portion is of a protruding shape.

Moreover, in a pneumatic tire having a land portion partitioned by a plurality of circumferential grooves, further improvement in wet braking performance is desired.

This disclosure is to provide a pneumatic tire capable of improving both the uneven wear resistance and the wet braking performance.

Solution to Problem

The pneumatic tire of this disclosure is a pneumatic tire including on a tread surface four or five circumferential grooves continuously extending in a tread circumferential direction, five or six land portions partitioned between tread ground contact edges and the circumferential grooves, and between the circumferential grooves, wherein: among the land portions, when a pair of land portions located on tread widthwise outermost sides are shoulder land portions, a pair of land portions adjacent to the shoulder land portions on tread widthwise inner sides are intermediate land portions, and one or a pair of land portions adjacent to the intermediate land portions on tread widthwise inner sides are central land portions, in a tread widthwise cross sectional view at an unloaded condition when the tire is mounted to an applicable rim and applied with a prescribed internal pressure, when drawing a virtual arc R1 protruding to a tire radial outer side, of which a center of curvature is located on a tire equatorial plain, across four tread widthwise edges adjacent to the circumferential grooves of outlines of the pair of intermediate land portions, a correlation among each protrusion amount $t1$, $t2$ and $t3$ of outlines of the central land portions, the intermediate land portions and the shoulder land portions from the virtual arc R1 satisfies:

$t1<t2$, and $t3<t2$.

According to the pneumatic tire of this disclosure, it is possible to improve both the uneven wear resistance and the wet braking performance.

Here, in this disclosure, the "applicable rim" is a valid industrial standard for the region in which the tire is produced or used, and refers to a standard rim of an applicable size (the "Measuring Rim" in the STANDARDS MANUAL of ETRTO (the European Tyre and Rim Technical Organization in Europe), and the "Design Rim" in the "YEAR BOOK" of TRA (the Tire and Rim Association, Inc.)) according to the "JATMA Year Book" of the JATMA (Japan Automobile Tire Manufacturers Association) in Japan, the "STANDARDS MANUAL" of ETRTO in Europe, or the "YEAR BOOK" of TRA in the United States of America. Moreover, the condition that a tire mounted to an applicable rim is "applied with a predetermined internal pressure" refers to a condition that the tire is mounted to the aforementioned applicable rim and applied with an air pressure corresponding to a maximum load capability (a maximum air pressure). Moreover, the "maximum load capability" refers to a maximum load capability of a single tire at an applicable size and ply rating described in the JATMA, etc.

Hereinafter, if not specifically defined, the dimensions, etc. of each element of the tread portion are measured at an unloaded condition when the tire is mounted to an applicable rim and applied with a prescribed internal pressure.

In this disclosure, the "tread widthwise edges" of the outlines of the land portions refer to intersection points in a tread widthwise cross sectional view of outlines of land portions (outlines forming the tire outer surface of the land portions) and groove walls of the circumferential grooves adjacent to the land portions. In the case where the groove walls and the outlines of the land portions connect to each other smoothly, the "tread widthwise edges" refer to inflection points when moving from the groove walls toward the outlines of the land portions. Moreover, the "tread widthwise edges" of the outlines of the shoulder land portions are inclusive of tread ground contact edges.

Further, in this disclosure, in the case where a tread widthwise position of at least one tread widthwise edge of outlines of a land portions is displaced in the tread circumferential direction, when all tread widthwise edges on the tread circumference of both tread widthwise sides of the outline of the land portion are projected in the tread circumferential direction, both tread widthwise edges with a maximum tread widthwise width of the outline of the land portion are regarded as both "tread widthwise edges" of the land portion. For example, in the case where tread widthwise positions of tread widthwise edges on both tread widthwise sides of the outline of one intermediate land portion are respectively displaced in the tread circumferential direction, a tread widthwise edge on a side closest to the tread ground contact edge among tread widthwise edges on tread ground contact edge sides is regarded as a tread widthwise edge on one side (the tread ground contact edge side) of the outline of the intermediate land portion, and a tread widthwise edge closest to the tire equator side among tread widthwise edges on the tire equator sides is regarded as a tread widthwise side on the other side (the tire equatorial plain side) of the outline of the intermediate land portion. Further, in the case where a part of or all tire widthwise positions among four tread widthwise edges of the outlines of the two intermediate land portions are displaced in the tread circumferential direction as mentioned above, the virtual arc R1 is an arc crossing four points, which are projections in the tread circumferential direction of the four tread widthwise edges regarded as "tread widthwise edges" as mentioned above, among which at least a part have different positions in the tread circumferential direction.

Moreover, the "tread ground contact edges" refer to tread widthwise outermost positions of the tread surface, and the "tread surface" refers to an outer circumferential surface of the entire circumference of the tire which contacts the road surface when the tire is rotated, in the condition where a tire mounted to an applicable rim and applied with a predetermined internal pressure is added with a load corresponding to the maximum load capability.

In this disclosure, the "protrusion amount" refers to a length measured in a tread widthwise cross sectional view, along the radial direction of the virtual arc R1 from the virtual arc R1 to positions on the outlines of each land portion farthest from the center of curvature of the virtual arc R1. Here, in the case where said position is located on the virtual arc R1 or on a side closer to the center of curvature than the virtual arc R1, the protrusion amount is handled as a value of "zero" or "minus".

Here, the pneumatic tire of this disclosure preferably satisfies the correlation among the protrusion amounts t1 to t3:

$t3<t1<t2$.

According to this configuration, it is possible to further improve the wet braking performance.

In the pneumatic tire of this disclosure, in the tread widthwise cross sectional view, it is preferable that in the tread widthwise cross sectional view, each outline of the land portions protrudes to the tire radial outer side, and simultaneously is formed of a plurality of arcs having radiuses of curvature smaller than a radius of curvature of the virtual arc R1.

According to this configuration, it is possible to further improve the wet braking performance, and simultaneously further suppress the uneven wear.

In the pneumatic tire of this disclosure, in the tread widthwise cross sectional view, it is preferable that the outlines of the shoulder land portions protrude to the tire radial outer side, and simultaneously are formed of a plurality of arcs having radiuses of curvature smaller than the radius of curvature of the virtual arc R1, where the radiuses of curvature of the plurality of arcs forming the outlines of the shoulder land portions are reduced toward the tread ground contact edge sides.

According to this configuration, it is possible to further improve the wet braking performance, and simultaneously further suppress the uneven wear.

Advantageous Effect

According to this disclosure, it is possible to provide a pneumatic tire capable of improving both the uneven wear resistance and the wet braking performance.

DETAILED DESCRIPTION

Hereinafter, embodiments of this disclosure will be described based on the drawings.

Figure 1:
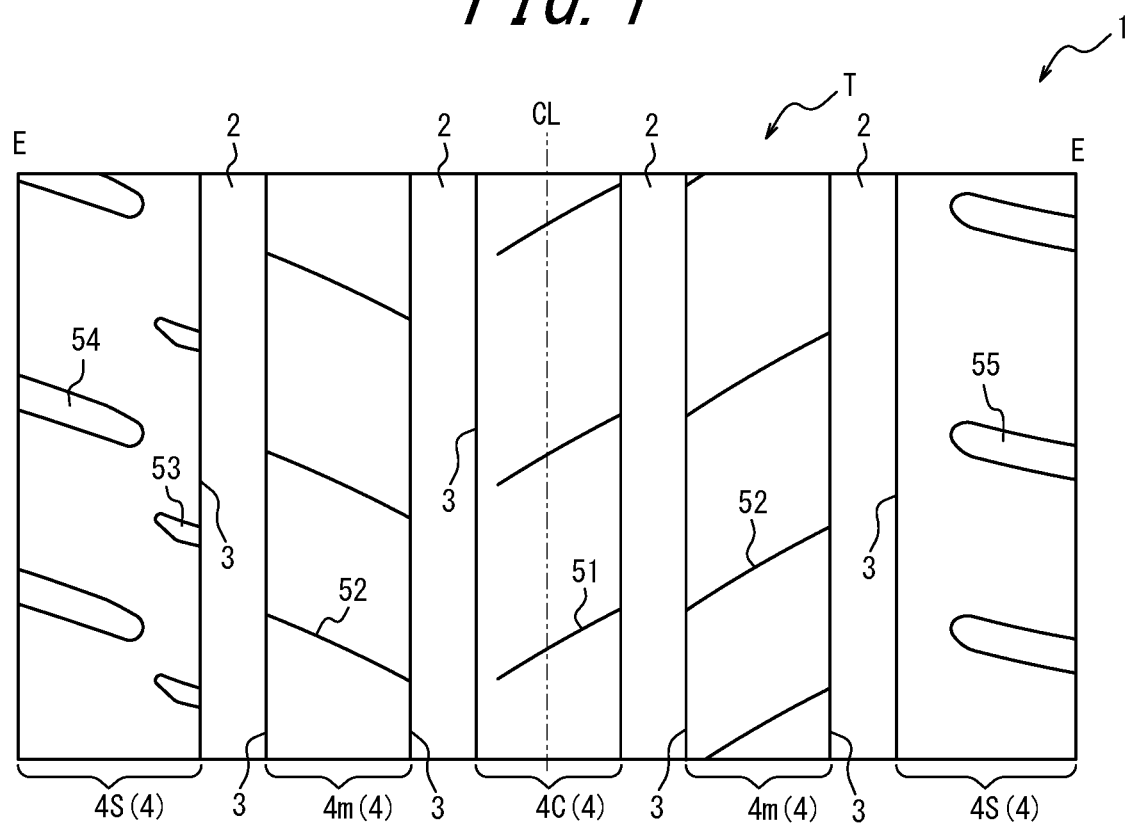
FIG. 1 is a development view illustrating a tread pattern of a pneumatic tire according to an embodiment of this disclosure.

FIG. 1 is a development view illustrating a tread pattern of a pneumatic tire according to an embodiment of this disclosure (hereinafter referred to as "the tire"). The tire 1, although partially omitted in the drawing, includes a carcass having a radial structure extending in a colloidal shape between bead portions, a belt disposed on a tire radial outer side of the carcass of a tread portion, and a tread rubber disposed on a tire radial outer side of the belt so as to form a tread surface T.

Here, as illustrated in FIG. 1, this tire 1 includes four or five circumferential grooves 2 (four linear circumferential grooves 2 in the illustrated example) disposed on the tread surface T, the circumferential grooves continuously extending in the tread circumferential direction. Further, the circumferential grooves 2 of this embodiment may be of any type as long as continuously extending in the tread circumferential direction, and may be of extending modes such as, e.g., zigzag shape, wavy shape and the like. Moreover, in this embodiment, in the case where four circumferential grooves 2 are disposed, the circumferential grooves 2 may be disposed substantially symmetrically with respect to the tire equatorial plain CL; and in the case where five circumferential grooves 2 are disposed, it is possible to dispose one circumferential groove 2 on the tire equatorial plain CL, and locate the other four circumferential grooves 2 substantially symmetrically with respect to the tire equatorial plain CL.

Figure 2:
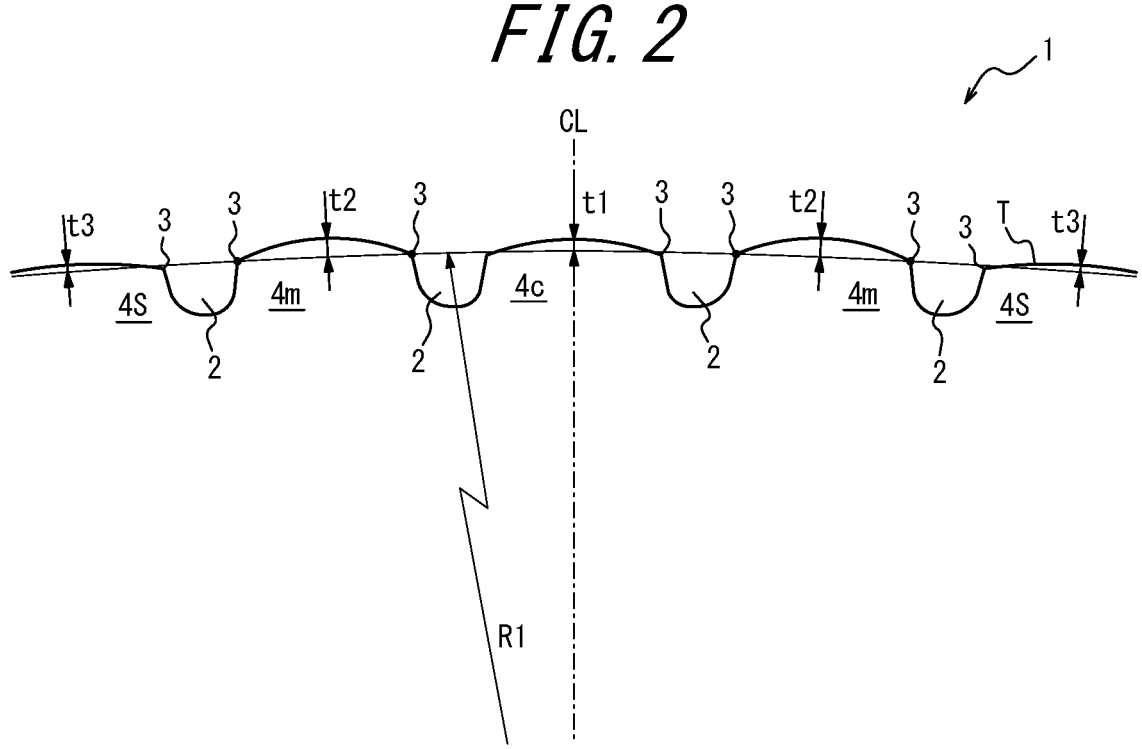
FIG. 2 is a partial cross-sectional view illustrating a tread widthwise cross section of the tread portion of the tire of FIG. 1.

The circumferential grooves 2 may respectively have different groove depths and groove widths, and may have, e.g., a groove depth of 6.0 mm to 10.0 mm, and a groove width of 6.0 mm to 20.0 mm. Here, the "groove depth" refers to a length measured along the tire radial direction from a groove bottom to a tread widthwise edge 3 adjacent to the groove (a larger length in the case where the lengths to the two tread widthwise edges adjacent to the groove are different), and the "groove width" refers to a length measured perpendicularly to the extension direction of the groove between both tread widthwise edges 3 adjacent to the groove. Here, in the present embodiment, as illustrated in FIG. 2, as for the circumferential grooves 2, in a tread widthwise cross sectional view, the groove walls on both sides are of a linear shape at least from the tread widthwise edges 3 to a certain position on the tire radial inner side.

In this tire 1, between the tread ground contact edges E and the circumferential grooves 2 and between the circumferential grooves 2, five or six (five in the illustrated example) land portions 4 are partitioned. Namely, this tire 1 includes a pair of shoulder land portions 4s sandwiched by the circumferential grooves 2 located on tread widthwise outermost sides among the circumferential grooves 2 and the tread ground contact edges E; a pair of intermediate land portions 4m adjacent to the shoulder land portions 4s on the tread widthwise inner sides in a manner sandwiching the circumferential grooves 2; and one or a pair of (one in the illustrated example) of central land portions 4c adjacent to the intermediate land portions 4m on the tread widthwise inner sides in a manner sandwiching the circumferential grooves 2. Here, as mentioned above, in this embodiment, since the circumferential grooves 2 are of a linear shape, each land portion 4c, 4m, 4s extends in a manner such that the land portion width is constant in the tread circumferential direction.

As illustrated in FIG. 1, disposed on the central land portion 4c are narrow grooves (sipes) 51 with groove widths of 1 mm or less, which extend from a circumferential groove 2 on one tread widthwise side (the right side in the drawing) among the two circumferential grooves 2 partitioning the land portion, in a manner inclined with respected to the tread widthwise direction, and end within the land portion. Moreover, disposed on the intermediate land portions 4m are narrow grooves (sipes) 52 with groove widths of 1 mm or less, which cross the land portions and connect to the two circumferential grooves 2 partitioning the land portions, and are inclined with respect to the tread widthwise direction. Further, disposed on the shoulder land portions 4s are lug grooves 53, 54, 55, which extend from the circumferential grooves 2 partitioning the land portions or from the tread ground contact edges E in a manner inclined with respect to the tread widthwise direction, and end within the land portions.

In this way, in the present embodiment, none of the land portions 4c, 4m, 4s includes a groove with a groove width of more than 1 mm from one end to the other end, of which both ends connect to a circumferential groove 2 or a tread ground contact edge E. In other words, if including a groove portion with a groove width of 1 mm or less, a groove of which both ends connect to a circumferential groove 2 or a tread ground contact edge E may be disposed on a land portion.

Here, from the viewpoint of the drainage performance and the silence due to a groove or groove portion with a groove width of 1 mm or less, the groove or groove portion may be subjected to chamfering at the opening position to the tread surface T. Moreover, although omitted in the drawing, it is preferable to dispose, on the shoulder land portions 4s, grooves which have a lug groove portion with a groove width of more than 1 mm, which extends in the tread widthwise direction from a tread ground contact edge E, and ends within the land portion; and have a narrow groove (sipe) portion with a groove width of 1 mm or less, which extend from the tread widthwise inner side edge of the lug groove portion, and opens to a circumferential groove 2 partitioning the shoulder land portions 4s. This is because that the drainage performance can be improved.

As illustrated, on this tire 1, a virtual arc R1 protruding to the tire radial outer side, of which the center of curvature is located on the tire equatorial plain CL, may be drawn across four tread widthwise edges 3 adjacent to the circumferential grooves 2 of the outlines of the pair of intermediate land portions 4m. Here, the virtual arc R1 may have a radius of curvature of 400 mm to 2400 mm.

In this embodiment, as illustrated, in a tread widthwise cross sectional view, the outlines of each land portion 4c, 4m, 4s protrude to the tire radial outer sides. Moreover, in a tread widthwise cross sectional view, the entire outlines of the intermediate land portions 4m are located on a tire radial side outer than the virtual arc R1 crossing the tread widthwise edges 3 on both tread widthwise sides of the intermediate land portions 4m. Moreover, the outlines of the central land portion 4c and the shoulder land portions 4s and the virtual arc R1 cross each other.

Here, in this tire 1, the correlation among each protrusion amount t1, t2 and t3 from the virtual arc R1 of the outlines of the central land portion 4c, the intermediate land portions 4m and the shoulder land portions 4s satisfies:

$t1 < t2$, and $t3 < t2$.

The effect of the tire 1 of the present embodiment is described below.

Conventionally, for example, in a tire concentrating on a central land portion among the tread surface, since the central land portion is of a shape protruding to the tire radial outer side, it is possible to achieve both the steering stability and the hydroplaning preventing performance. However, there is a risk that uneven wear of this land portion becomes severe. Moreover, in a pneumatic tire having a land portion partitioned by a plurality of circumferential grooves, further improvement in the wet braking performance is desired.

Then, having intensively studied methods for improving the uneven wear resistance and the wet braking performance, we discovered that by specifying the correlation among the shapes of a plurality of land portions in a tread widthwise cross section, it is possible to improve both the uneven wear resistance and the wet braking performance.

Namely, in this tire 1, since each protrusion amount t1 to t3 from the virtual arc R1 of the outlines of the central land portion 4c, the intermediate land portions 4m and the shoulder land portions 4s satisfies the aforementioned correlation, it is possible to improve both the uneven wear resistance and the wet braking performance. Specifically, the central portion of the tread surface T is an area with a large ground contact length to the road surface among ground contact areas (footprint), and thus is likely to be worn comparatively (likely to generate uneven wear). Therefore, by setting the protrusion amount t1 of the outline of the central land portion 4c with respect to the virtual arc R1 smaller than the protrusion amount t2 of the outlines of the intermediate land portions 4m, it is possible to suppress the wearing of the central land portion 4c located on the central portion, and to thereby improve the uneven wear resistance.

Moreover, by setting the protrusion amount t3 of the outlines of the shoulder land portions 4s with respect to the virtual arc R1 smaller than the protrusion amount t2 of the outlines of the intermediate land portions 4m, even if the protrusion amount t1 of the outline of the central land portion 4c with respect to the virtual arc R1 is set smaller than the protrusion amount t2 of the outlines of the intermediate land portions 4m, it is possible to set the ground contact length of a central area (an area inclusive of the central land portion 4c and the intermediate land portions 4m; the same below.) larger than the ground contact length of a shoulder area (an area inclusive of the shoulder land portions 4s; the same below.), and to set the entire ground contact area to a sharp-pointed shape. Therefore, the drainage to the tread widthwise outer side becomes easy, and thus it is possible to improve the wet braking performance.

In the tire 1 of the present embodiment, the correlation among the protrusion amounts t1 to t3 of the outlines of each land portion 4c, 4m, 4s preferably satisfies:

$$t3 < t1 < t2.$$

According to this configuration, it is possible to further improve the wet braking performance. Specifically, if the ground contact pressure of the shoulder land portions 4s becomes high when braking, the shoulder land portions 4s themselves are likely to hinder the drainage to the tread widthwise outer side. However, by comparatively reducing the protrusion amount t3 of the shoulder land portions 4s, it is possible to avoid increase of the ground contact pressure, and to further improve the wet braking performance. Moreover, by setting the protrusion amounts to the aforementioned correlation, the ground contact length of the central area becomes larger than the ground contact length of the shoulder area, and it is possible to set the entire ground contact area to a sharp-pointed shape. Therefore, it is possible to further improve the wet braking performance.

In the tire 1 of the present embodiment, the correlation between the protrusion amounts t1, t2 of the outlines of the central land portion 4c and the intermediate land portions 4m preferably satisfies:

$$0.4 \times t2 \leq t1 \leq 0.9 \times t2.$$

By satisfying $0.4 \times t2 \leq t1$, the ground contact length of the ground contact area of the central area in the tread surface T does not become excessively small, and thus it is possible to sufficiently maintain a sharp-pointed ground contact area, and to further improve the wet braking performance. Moreover, by satisfying $t1 \leq 0.9 \times t2$, it is possible to sufficiently shorten the ground contact length of the central land portion 4c, and to thereby further improve the uneven wear resistance.

Further, from the same viewpoint, the correlation between the protrusion amounts t1, t2 preferably satisfies:

$$0.5 \times t2 \leq t1 \leq 0.7 \times t2.$$

The correlation among the protrusion amounts t1 to t3 of the outlines of each land portion 4c, 4m, 4s preferably satisfies:

$$t2 - t1 < t1 - t3.$$

By satisfying the aforementioned correlation among the protrusion amounts, the ground contact length of the central area becomes sufficiently larger than the ground contact length of the shoulder area, and it is possible to further improve the wet braking performance.

Here, in a tread widthwise cross sectional view, the outlines of each land portion 4c, 4m, 4s are not limited, but as mentioned above, preferably protrude to the tire radial outer side, and preferably are formed of a plurality of arcs having radiuses of curvature smaller than the radius of curvature of the virtual arc R1. According to this configuration, it is possible to further improve the wet braking performance. Specifically, by setting the outlines of each land portion 4c, 4m, 4s to the aforementioned shapes, it is possible to adjust the outlines of each land portion 4c, 4m, 4s in order to concentrate the ground contact pressure of each land portion when the vicinity of their widthwise central sides contact the road surface. In this case, the tread surface T becomes likely to bite into the road surface, and simultaneously, water between the tread surface T and the road surface becomes likely to be smoothly drained into the circumferential grooves 2, and thus it is possible to further improve the wet braking performance. Moreover, in this case, by suppressing the increase of the ground contact pressure of the tread widthwise edges 3 of each land portion, the uneven wear on the tread widthwise edge 3 sides of the land portions can be suppressed as well.

Further, when the outlines of each land portion 4c, 4m, 4s are respectively formed of one arc, if the arc is excessively large, there is a risk that it is impossible to sufficiently concentrate the ground contact pressure to the vicinity of the widthwise central sides of each land portion 4c, 4m, 4s during ground contact to the road surface, which renders the drainage difficult. Alternatively, if the arc is excessively small, there is a risk that the ground contact pressure excessively concentrate to the vicinity of the widthwise central sides of each land portion 4c, 4m, 4s, which deteriorates the uneven wear resistance; or the tread widthwise edge 3 sides of each land portion 4c, 4m, 4s do contact the ground, which deteriorates the steering stability.

As mentioned above, the outlines of each land portion 4c, 4m, 4s preferably protrude to the tire radial outer side, and preferably are formed of a plurality of arcs having radiuses of curvature smaller than the radius of curvature of the virtual arc R1, while from the viewpoint of improving the wet braking performance and suppressing the uneven wear, the radiuses of curvature of the plurality of arcs are preferably reduced from the widthwise central portions toward the outer sides of the land portions.

In a tread widthwise cross sectional view, it is preferable that the outlines of the shoulder land portions 4s are formed of a plurality of arcs having radiuses of curvature smaller than the radius of curvature of the virtual arc R1, and that the radiuses of curvature of the plurality of arcs for forming the outlines of the shoulder land portions are reduced toward the tread ground contact edge sides. According to this configuration, it is possible to further improve the wet braking performance. Specifically, by setting the outlines of the shoulder land portions 4s as mentioned above, when braking, it is possible to further reduce the ground contact pressure of shoulder land portions 4s, particularly on the tread ground contact edge E sides, and thus it is possible to sufficiently improve the drainage performance and the wet braking performance.

From the viewpoint of improving the wet braking performance, it is preferable that the radiuses of curvature of all the arcs for forming the outlines of the shoulder land portions 4s are ½₀ to ½ of the radius of curvature of the virtual arc R1. By setting the radiuses of curvature to ½₀ or more of the radius of curvature of the virtual arc R1, it is possible to prevent the ground contact pressure of the shoulder land portions 4s from being excessively low, and by setting the same to ½ or less of the radius of curvature of the virtual arc R1, it is possible to prevent the ground contact pressure of the shoulder land portions 4s from being excessively high.

The protrusion amount t1 of the outline of the central land portion 4c is preferably 0.2 mm to 0.9 mm, and in a tread widthwise cross sectional view, a length measured along the radial direction of the virtual arc R1 from the tread widthwise edges 3 of the central land portion 4c to a position farthest from the center of curvature of the virtual arc R1 is preferably 0.3 mm to 1.0 mm. Moreover, the protrusion amount t2 of the outlines of the intermediate land portions 4m is preferably 0.3 mm to 1.0 mm. The protrusion amount t3 of the outlines of the shoulder land portions 4s are preferably 0 to 0.7 mm, and in a tread widthwise cross sectional view, a length measure along the radial direction of the virtual arc R1 from the tread widthwise edges 3 adjacent to circumferential grooves 2 of the shoulder land portions 4s to a position farthest from the center of curvature of the virtual arc R1 is preferably 00.3 mm to 0.8 mm.

The embodiment of this disclosure is described in the above by referring to the drawings, while the pneumatic tire of this disclosure may be appropriately varied without being limited to the aforementioned example.

TABLE 1

| | | Comparative Example 1 | Comparative Example 2 | Comparative Example 3 | Comparative Example 4 | Example 1 | Example 2 |
|---|---|---|---|---|---|---|---|
| Protrusion amount (mm) | Central land portion t1 | 0.8 | 0.2 | 0.8 | 0.8 | 0.4 | 0.4 |
| | Intermediate land portion t2 | 0.4 | 0.4 | 0.2 | 0.8 | 0.8 | 0.8 |
| | Shoulder land portion t3 | 0.2 | 0.8 | 0.4 | 0.8 | 0.2 | 0.2 |
| Number of land portion arcs | | Plural | Plural | Plural | Plural | Plural | Single |
| Performances | Wet braking performance | 100 | 97 | 97 | 97 | 104 | 102 |
| | Uneven wear resistance | 100 | 95 | 95 | 90 | 100 | 100 |

INDUSTRIAL APPLICABILITY

According to this disclosure, it is possible to provide a pneumatic tire capable of improving both the uneven wear resistance and the wet braking performance.

REFERENCE SIGNS LIST 1 pneumatic tire
2 circumferential groove
3 tread widthwise edge
4 land portion
4c central land portion
4m intermediate land portion
4s shoulder land portion
51, 52 narrow groove
53, 54, 55 lug groove
CL tire equatorial plain
E tread ground contact edge
R1 virtual arc
T tread surface
t1, t2, t3 protrusion amount

The invention claimed is:

1. A pneumatic tire, comprising on a tread surface four or five circumferential grooves continuously extending in a tread circumferential direction, five or six land portions partitioned between tread ground contact edges and the circumferential grooves, and between the circumferential grooves, wherein:
among the land portions, when a pair of land portions located on tread widthwise outermost sides are shoulder land portions, a pair of land portions adjacent to the shoulder land portions on tread widthwise inner sides are intermediate land portions, and one or a pair of land portions adjacent to the intermediate land portions on tread widthwise inner sides are central land portions,
in a tread widthwise cross sectional view at an unloaded condition when the tire is mounted to an applicable rim and applied with a prescribed internal pressure,
when drawing a virtual arc R1 protruding to a tire radial outer side, of which a center of curvature is located on a tire equatorial plane, across four tread widthwise edges adjacent to the circumferential grooves of outlines of the pair of intermediate land portions,
a correlation among each protrusion amount t1, t2 and t3 of outlines of the central land portions, the intermediate land portions and the shoulder land portions from the virtual arc R1 satisfies:

t1<t2, and t3<t2;

in the tread widthwise cross sectional view, entire outlines of the intermediate land portions are located on a tire radial side outside of the virtual arc R1 wherein the outlines of the central land portions and outlines of the virtual arc cross each other, and wherein the outlines of the shoulder land portions and the outlines of the virtual arc cross each other; and
the virtual arc is positioned further radially outward than tread widthwise edges of the central land portions and the virtual arc is also positioned further radially outward than tread widthwise edges of the shoulder land portions which are closest to the tire equatorial plane.

2. The pneumatic tire according to claim 1, wherein:
the correlation among the protrusion amounts t1 to t3 satisfies:

t3<t1<t2.

3. The pneumatic tire according to claim 2, wherein:
in the tread widthwise cross sectional view,
each outline of the land portions protrudes to the tire radial outer side, and simultaneously is formed of a plurality of arcs having radiuses of curvature smaller than a radius of curvature of the virtual arc R1.

4. The pneumatic tire according to claim 3, wherein:
in the tread widthwise cross sectional view,
the outlines of the shoulder land portions protrude to the tire radial outer side, and simultaneously are formed of a plurality of arcs having radiuses of curvature smaller than the radius of curvature of the virtual arc R1, where:
the radiuses of curvature of the plurality of arcs forming the outlines of the shoulder land portions are reduced toward tread ground contact edge sides.

5. The pneumatic tire according to claim 2, wherein:
in the tread widthwise cross sectional view,
the outlines of the shoulder land portions protrude to the tire radial outer side, and simultaneously are formed of a plurality of arcs having radiuses of curvature smaller than the radius of curvature of the virtual arc R1, where:
the radiuses of curvature of the plurality of arcs forming the outlines of the shoulder land portions are reduced toward tread ground contact edge sides.

6. The pneumatic tire according to claim 1, wherein:
in the tread widthwise cross sectional view,
each outline of the land portions protrudes to the tire radial outer side, and simultaneously is formed of a plurality of arcs having radiuses of curvature smaller than a radius of curvature of the virtual arc R1.

7. The pneumatic tire according to claim 6, wherein:
in the tread widthwise cross sectional view,
the outlines of the shoulder land portions protrude to the tire radial outer side, and simultaneously are formed of a plurality of arcs having radiuses of curvature smaller than the radius of curvature of the virtual arc R1, where:
the radiuses of curvature of the plurality of arcs forming the outlines of the shoulder land portions are reduced toward tread ground contact edge sides.

8. The pneumatic tire according to claim 1, wherein:
in the tread widthwise cross sectional view,
the outlines of the shoulder land portions protrude to the tire radial outer side, and simultaneously are formed of a plurality of arcs having radiuses of curvature smaller than the radius of curvature of the virtual arc R1, where:
the radiuses of curvature of the plurality of arcs forming the outlines of the shoulder land portions are reduced toward tread ground contact edge sides.

* * * * *